(12) United States Patent
Kurihara et al.

(10) Patent No.: US 8,611,623 B2
(45) Date of Patent: Dec. 17, 2013

(54) NETWORK CONSTRUCTION APPARATUS, METHOD AND PROGRAM

(75) Inventors: Yuichi Kurihara, Minato-ku (JP); Yoshiro Kitamura, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 95 days.

(21) Appl. No.: 13/422,576

(22) Filed: Mar. 16, 2012

(65) Prior Publication Data

US 2012/0237094 A1  Sep. 20, 2012

(30) Foreign Application Priority Data

Mar. 18, 2011  (JP) ................................. 2011-060193

(51) Int. Cl.
*G06K 9/00* (2006.01)

(52) U.S. Cl.
USPC ........................................................ 382/128

(58) Field of Classification Search
USPC ........................................................ 382/128
See application file for complete search history.

(56) References Cited

U.S. PATENT DOCUMENTS

| | | | | |
|---|---|---|---|---|
| 6,690,816 B2 * | 2/2004 | Aylward et al. | ............... | 382/128 |
| 7,855,723 B2 * | 12/2010 | Preiss et al. | .................. | 345/419 |
| 8,073,221 B2 * | 12/2011 | Kukuk et al. | ................. | 382/128 |
| 8,121,367 B2 * | 2/2012 | Socher et al. | ................. | 382/128 |
| 2009/0185731 A1 * | 7/2009 | Ray et al. | ....................... | 382/131 |
| 2009/0208078 A1 * | 8/2009 | Fritz et al. | ...................... | 382/130 |
| 2010/0082692 A1 * | 4/2010 | Akinyemi et al. | ............ | 707/797 |
| 2010/0128940 A1 * | 5/2010 | Buelow et al. | ............... | 382/128 |
| 2011/0135172 A1 | 6/2011 | Kitamura | | |
| 2011/0274323 A1 * | 11/2011 | Klingenbeck | ................. | 382/128 |

OTHER PUBLICATIONS

Nakamura, Sho, et al., "Automated Classification of Pulmonary Artery and Vein from Chest X-ray CT Images by Tree Structure Analysis", Technical Report of IEICE (The Institute of Electronics, Information and Communication Engineers), MI2005-134, 2005, pp. 1-4; http: //www/murase.nuie.nagoya-u.ac.jp/ide/res/paper/j05-kenkyukai-snaka-1.pdf.*

* cited by examiner

*Primary Examiner* — Tom Y Lu
(74) *Attorney, Agent, or Firm* — Sughrue Mion, PLLC

(57) ABSTRACT

A likelihood of a cross segment is calculated based on a cross segment characteristic condition defining a characteristic that a portion corresponding to an intermingled portion of a structure is present as a cross segment, and that at least two pairs of segments connectable in a straight line are present in the neighborhood of the cross segment. A likelihood of a straight line representing a probability that each segment is connected, in a straight line, to another segment is calculated based on a straight line connection condition defining a characteristic that each segment is connected, in a straight line, to another segment in the neighborhood thereof. A strength of connection between the segments is set based on the likelihood of a cross segment and the likelihood of a straight line, and plural network structures are constructed by connecting the segments based on the strength of connection.

13 Claims, 5 Drawing Sheets

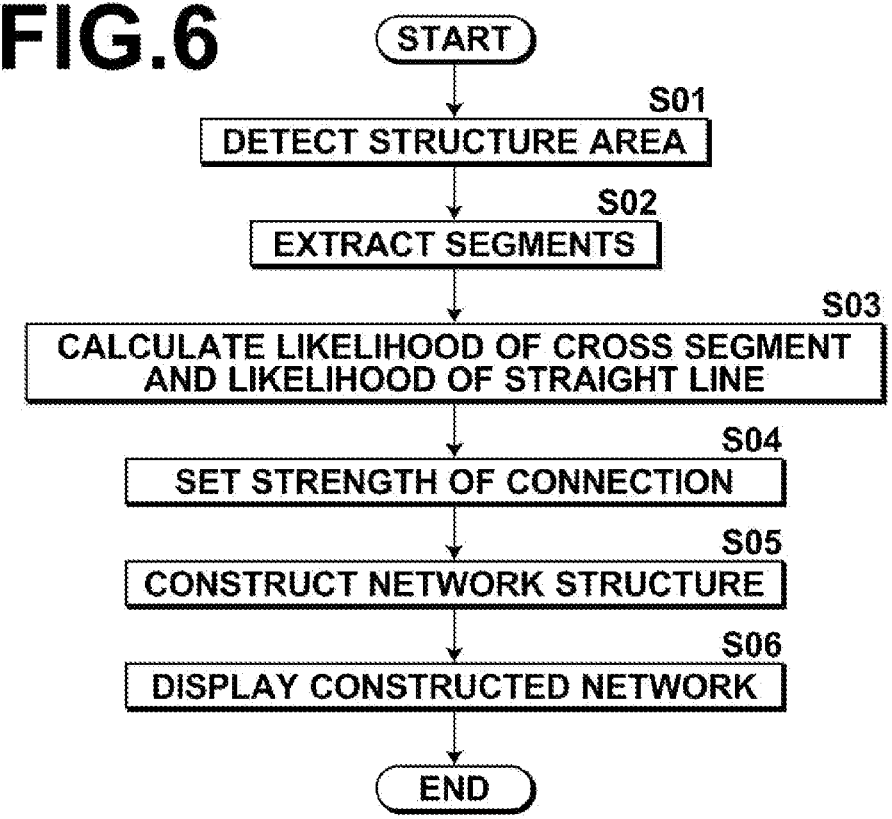
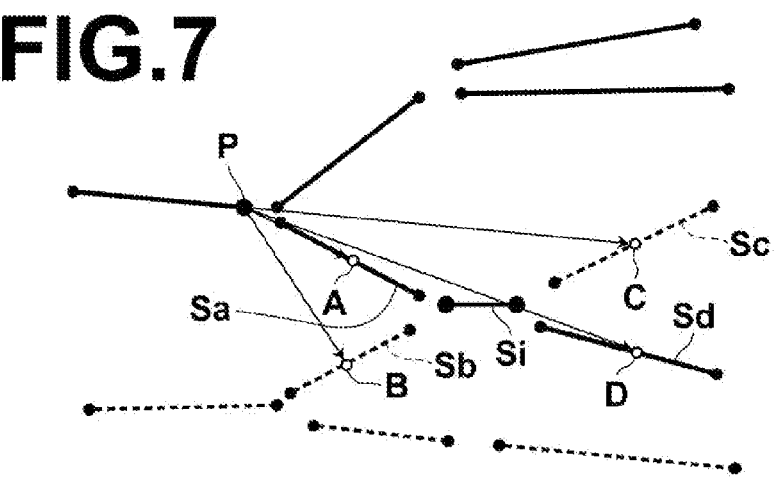

US 8,611,623 B2

NETWORK CONSTRUCTION APPARATUS, METHOD AND PROGRAM

BACKGROUND OF THE INVENTION

1. Field of the Invention

The present invention relates to a network construction apparatus, method and program for constructing, as a network structure, a specific structure detected from image data.

2. Description of the Related Art

In recent years, high-quality 3D images are used in image-based diagnosis supported by an advance of medical equipment (for example, a multi-detector CT, or the like). Since a 3D image is composed of many 2D images, which have a large data amount, doctors need long time in some cases to find desirable observation regions to diagnose patients. Therefore, some attempt is being made to improve the efficacy of diagnosis by improving the visibility of a whole organ or a lesion by extracting an organ of interest, and by displaying the extracted organ of interest by MIP, VR, CPR, or the like. For example, when a chest CT image is analyzed, and especially when the lung is analyzed, extraction of a center path of a pulmonary artery and a center path of a pulmonary, as independent network structures, is requested.

S. Nakamura et al., "Automated Classification of Pulmonary Artery and Vein from Chest X-ray CT Images by Tree Structure Analysis", Technical Report of IEICE (the Institute of Electronics Information and Communication Engineers), MI2005-134, [online], [searched on 2010], Internet URL: http://www.murase.nuie.nagoya-u.ac.jp/~ide/res/paper/J05-kenkyukai-snaka-1.pdf (Non-Patent Document 1) discloses a method for constructing network structures. In the method, blood vessels are extracted, as network structures, from an image of a lung region, and the extracted network structures, which are intermingled with each other, are constructed as independent network structures corresponding to a pulmonary artery and a pulmonary vein. Specifically, segments are generated from each of the structures of blood vessels, and directed network structures of the generated segments are constructed, in directions away from the hilum of lung, from portions of the pulmonary artery and the pulmonary vein that are close to the hilum of lung, as start points. Further, with regard to a problem that pulmonary veins or pulmonary arteries are not correctly connected to each other, Non-Patent Document 1 discloses the following network construction method. The pulmonary veins or pulmonary arteries are not correctly connected to each other because a part of the pulmonary artery and a part of the pulmonary vein that should be extracted as separate segments are extracted as a segment (hereinafter, referred to as a cross segment in some cases) at a position in which the pulmonary artery and the pulmonary vein are in contact with each other. For this problem, Non-Patent Document 1 discloses construction of the directed network structure, in which the direction of the course of a blood vessel is defined at a core line branch of the blood vessel. With respect to a vertex having an indegree greater than or equal to 2, a cross segment is divided at the vertex or at the endpoints of edges stemming from the vertex, and plural segments in the neighborhood of the cross segment are reconnected to each other so that the inner product of a combination of segments is maximized.

However, the method disclosed in Non-Patent Document 1 needs information about the location of a root of the network structure, in addition to the information about each of the extracted segments, to identify the forward direction of the directed network structure. Therefore, when the direction of the network structure is not known, or when the direction of the network structure is erroneously selected, the method disclosed in Non-Patent Document 1 is not able to correctly construct a network structure.

SUMMARY OF THE INVENTION

In view of the foregoing circumstances, it is an object of the present invention to provide a network construction apparatus, method and program that can accurately detect a predetermined structure in image data even if there is no information about the location of a root of the network structure.

A network construction apparatus of the present invention is a network construction apparatus that extracts, as a plurality of segments, each of a plurality of predetermined structures, each including a straight line portion intermingled with each other, from medical image data, and that constructs a plurality of network structures by connecting the extracted plurality of segments for each of the plurality of predetermined structures, the apparatus comprising:

a strength-of-connection setting means that includes:

a likelihood-of-cross-segment calculation means that calculates a likelihood of a cross segment representing a probability that each of the extracted plurality of segments is a cross segment, which is a segment, based on a cross segment characteristic condition defining a geometric characteristic between segments in the neighborhood of the intermingled straight line portion that a portion corresponding to the intermingled straight line portion of each of the plurality of predetermined structures is present as a cross segment, and that at least two pairs of segments connectable to each other in a straight line are present in the neighborhood of the cross segment; and a likelihood-of-straight-line calculation means that calculates a likelihood of a straight line representing a probability that each of the segments is connected, in a straight line, to another segment based on a straight line connection condition defining a geometric characteristic between the segments that each of the segments is connected, in a straight line, to another segment in the neighborhood of each of the segments, and a strength-of-connection setting means setting a strength of connection between the segments by using the likelihood of a cross segment and the likelihood of a straight line with respect to each of the extracted plurality of segments; and a network structure construction means that constructs the plurality of network structures by connecting the segments based on the set strength of connection.

A network construction method of the present invention is a network construction method that extracts, as a plurality of segments, each of a plurality of predetermined structures, each including a straight line portion intermingled with each other, from medical image data, and that constructs a plurality of network structures by connecting the extracted plurality of segments for each of the plurality of predetermined structures, the method comprising the steps of:

calculating a likelihood of a cross segment representing a probability that each of the extracted plurality of segments is a cross segment, which is a segment, based on a cross segment characteristic condition defining a geometric characteristic between segments in the neighborhood of the intermingled straight line portion that a portion corresponding to the intermingled straight line portion of each of the plurality of predetermined structures is present as a cross segment, and that at least two pairs of segments connectable to each other in a straight line are present in the neighborhood of the cross segment;

calculating a likelihood of a straight line representing a probability that each of the segments is connected, in a straight line, to another segment based on a straight line connection condition defining a geometric characteristic between the segments that each of the segments is connected, in a straight line, to another segment in the neighborhood of each of the segments;

setting a strength of connection between the segments by using the likelihood of a cross segment and the likelihood of a straight line with respect to each of the extracted plurality of segments; and constructing the plurality of network structures by connecting the segments based on the set strength of connection.

A network construction program of the present invention is a network construction program that extracts, as a plurality of segments, each of a plurality of predetermined structures, each including a straight line portion intermingled with each other, from medical image data, and that constructs a plurality of network structures by connecting the extracted plurality of segments for each of the plurality of predetermined structures, the program causing a computer to function as:

a strength-of-connection setting means that includes:

a likelihood-of-cross-segment calculation means that calculates a likelihood of a cross segment representing a probability that each of the extracted plurality of segments is a cross segment, which is a segment, based on a cross segment characteristic condition defining a geometric characteristic between segments in the neighborhood of the intermingled straight line portion that a portion corresponding to the intermingled straight line portion of each of the plurality of predetermined structures is present as a cross segment, and that at least two pairs of segments connectable to each other in a straight line are present in the neighborhood of the cross segment; and a likelihood-of-straight-line calculation means that calculates a likelihood of a straight line representing a probability that each of the segments is connected, in a straight line, to another segment based on a straight line connection condition defining a geometric characteristic between the segments that each of the segments is connected, in a straight line, to another segment in the neighborhood of each of the segments, and the strength-of-connection setting means setting a strength of connection between the segments by using the likelihood of a cross segment and the likelihood of a straight line with respect to each of the extracted plurality of segments; and a network structure construction means that constructs the plurality of network structures by connecting the segments based on the set strength of connection.

Further, the term "network structure" means a graph structure that abstractly represents the manner of connection between plural vertices (nodes), as a structure composed of vertices and edges connecting the vertices. Here, the graph structure may include a loop or multiple edges. Further, when plural network structures are constructed by applying the present invention to plural blood vessels, such as a pulmonary artery and a pulmonary vein in a lung, or a portal vein, a hepatic artery, and a hepatic vein in a liver, each of the constructed plural network structures is a tree structure that includes neither a loop nor multiple edges.

Here, a predetermined structure is an object from which a geometric model is formable as a network structure by vertices (nodes) and edges connecting the vertices, which correspond to plural segments. Further, the predetermined structure has a characteristic that the segments are connected to each other, in a straight line, by using edges. The predetermined structure may be any kind of structure as long as each of plural predetermined objects is a structure including a straight line portion intermingled with each other. For example, the plural predetermined structures may be a pulmonary artery and a pulmonary vein in a lung, or a portal vein, a hepatic artery, and a hepatic vein in a liver.

Further, the medical image data may be obtained by imaging, for example, by a CT, an MRI, an ultrasonic apparatus, a PET-CT, a SPECT, a 4D-CT, an OCT, an X-ray radiographic apparatus (CR, DR), or the like. The medical image data may be three-dimensional image data, such as volume data, for example.

Here, the term "strength of connection" means an index value representing the strength of connection between segments. The network structure construction means may adopt any kind of network construction method as long as segments are connectable, based on the strength of connection, in such a manner that the strength of connection between the segments becomes higher. For example, the network structure construction means may construct a network by adopting a spanning tree generation algorithm, such as a minimum spanning tree algorithm and a shortest path tree algorithm, so that a cost function using, as a cost, the strength of connection is minimized.

Further, as the method for extracting each of plural predetermined structures, as plural segments, any kinds of known method are adoptable as long as a structure is extractable as plural segments. For example, the network construction apparatus of the present invention may detect an area having the image characteristic of a predetermined structure in image data, and extract plural segments by obtaining a thin line by performing thinning on the detected area, and by dividing the obtained thin line based on a branch point, a predetermined distance, or the like. Further, the apparatus may perform the network construction processing of the present invention by using the extracted plural segments. Alternatively, the network construction apparatus of the present invention may perform the network construction processing of the present invention by obtaining data of plural segments, which are data after segmentation processing on image data.

In the network construction apparatus of the present invention, it is desirable that the strength-of-connection setting means sets a strength of connection between a segment having a high likelihood of a cross segment and another segment to a small value, and sets a strength of connection between segments each having a high likelihood of a straight line to a large value.

Here, the expression "sets a strength of connection between a segment having a high likelihood of a cross segment and another segment to a small value" means that the strength of connection is set to a sufficiently small value so that the segment having a high likelihood of a cross segment is connected to none of the other segments when a network structure is constructed based on the strength of connection. Further, the expression "sets a strength of connection between segments each having a high likelihood of a straight line to a large value" means that the strength of connection is set to a relatively large value so that the segments, each having a high likelihood of a straight line, are likely to be connected to each other when a network structure is constructed based on the strength of connection.

Further, the cross segment characteristic condition may define the geometric characteristic that at least two pairs of segments connectable to each other in a straight line are present in the neighborhood of the cross segment by using an arbitrary condition. For example, the cross segment characteristic condition may define the geometric characteristic by using a distance between the segments in each of the at least two pairs of segments as well as at least one of an angle between the segments and a degree of overlapping between the segments projected onto a predetermined straight line.

Further, the cross segment characteristic condition may define the geometric characteristic that at least two pairs of segments connectable to each other in a straight line are present in the neighborhood of the cross segment by using an arbitrary condition. For example, the cross segment characteristic condition may define the geometric characteristic, as a characteristic that at least four segments connectable to the cross segment are present in the neighborhood of the cross segment, and the at least four segments constitute at least two pairs of segments connectable to each other in a straight line.

Further, the cross segment characteristic condition may define the characteristic that at least four segments connectable to the cross segment are present in the neighborhood of the cross segment by using an arbitrary condition. For example, the cross segment characteristic condition may define the characteristic by using at least one of a shortest distance between vertices of segments in each of the at least two pairs of segments, and a criterion that a shortest distance between straight lines including the segments is less than or equal to a predetermined threshold value and the degree of overlapping between the segments projected onto a predetermined straight line is not positive.

Further, the cross segment characteristic condition may define the geometric characteristic that at least two pairs of segments connectable to each other in a straight line are present by using an arbitrary condition. For example, the cross segment characteristic condition may define the geometric characteristic based on a criterion that at least two pairs of segments constituting straight lines with a small shortest distance between the straight lines, and the segments in the neighborhood of the cross segment in each of the at least two pairs of segments having a small angle therebetween, are present.

The straight line connection condition may define the geometric characteristic that each of the segments is connected, in a straight line, to another segment in the neighborhood of each of the segments by using an arbitrary condition. The straight line connection condition may define the geometric characteristic by using an angle between the segments as well as at least one of a shortest distance between vertices of the segments, a shortest distance between straight lines including the segments and a degree of overlapping between the segments projected onto a predetermined straight line.

Further, the strength-of-connection setting means of the present invention may set the strength of connection based on a further condition that the segments are connected to each other, in a straight line, along a forward direction of the network structure. For example, the strength-of-connection setting means may perform weighting, based on the condition that the segments are connected to each other in a straight line along a forward direction of the network structure, in such a manner that the strength of connection between a pair of segments becomes large when the gradient of a vector from the vertex (parent) of a predetermined segment to a middle point of the other one of the pair of segments is small, and that the strength of connection between a pair of segments becomes small when the gradient of a vector from the vertex (parent) of a predetermined segment to a middle point of the other one of the pair of segments is large.

It is desirable that the network construction apparatus of the present invention further includes a display control means that distinguishably displays, on a display device, at least one segment of the extracted plurality of segments, the at least one segment having the likelihood of a cross segment that is greater than or equal to a predetermined threshold value.

Here, any kinds of known distinguishable display method may be adopted to distinguishably display such a segment. For example, a segment that has the likelihood of a cross segment greater than or equal to a predetermined threshold value may be displayed in a different color from the other segments. Alternatively, a display window may be displayed on a display screen to distinguishably display a segment that has the likelihood of a cross segment greater than or equal to a predetermined threshold value. Further, a segment that has the likelihood of a cross segment greater than or equal to a predetermined threshold value and segments in the neighborhood of the segment may be enlarged and displayed in the display window.

According to the network construction apparatus, method and program of the present invention, each of a plurality of predetermined structures, each including a straight line portion intermingled with each other, is extracted from image data, as a plurality of segments, and a plurality of network structures are constructed by connecting the extracted plurality of segments for each of the plurality of predetermined structures. A likelihood of a cross segment representing a probability that each of the extracted plurality of segments is a cross segment, which is a segment, is calculated based on a cross segment characteristic condition defining a geometric characteristic between segments in the neighborhood of the intermingled straight line portion that a portion corresponding to the intermingled straight line portion of each of the plurality of predetermined structures is present as a cross segment, and that at least two pairs of segments connectable to each other in a straight line are present in the neighborhood of the cross segment. Further, a likelihood of a straight line representing a probability that each of segments is connected, in a straight line, to another segment is calculated based on a straight line connection condition defining a geometric characteristic between the segments that each of the segments is connected, in a straight line, to another segment in the neighborhood of each of the segments. Further, a strength of connection between the segments is set by using the likelihood of a cross segment and the likelihood of a straight line with respect to each of the extracted plurality of segments. Further, the plurality of network structures are constructed by connecting the segments based on the set strength of connection. Therefore, it is possible to effectively prevent the problem of erroneous connection of a cross segment only by using a geometric characteristic between segments. Consequently, it is possible to accurately construct, as plural network structures, plural predetermined structures, each having a straight line portion intermingled with each other.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 6 is a diagram for explaining a flow of processing by a network construction apparatus of the present invention; and FIG. 7 is a diagram for explaining a method for setting a strength of connection between segments by using information about the direction of the course of a blood vessel.

DESCRIPTION OF THE PREFERRED EMBODIMENTS

Figure 1:
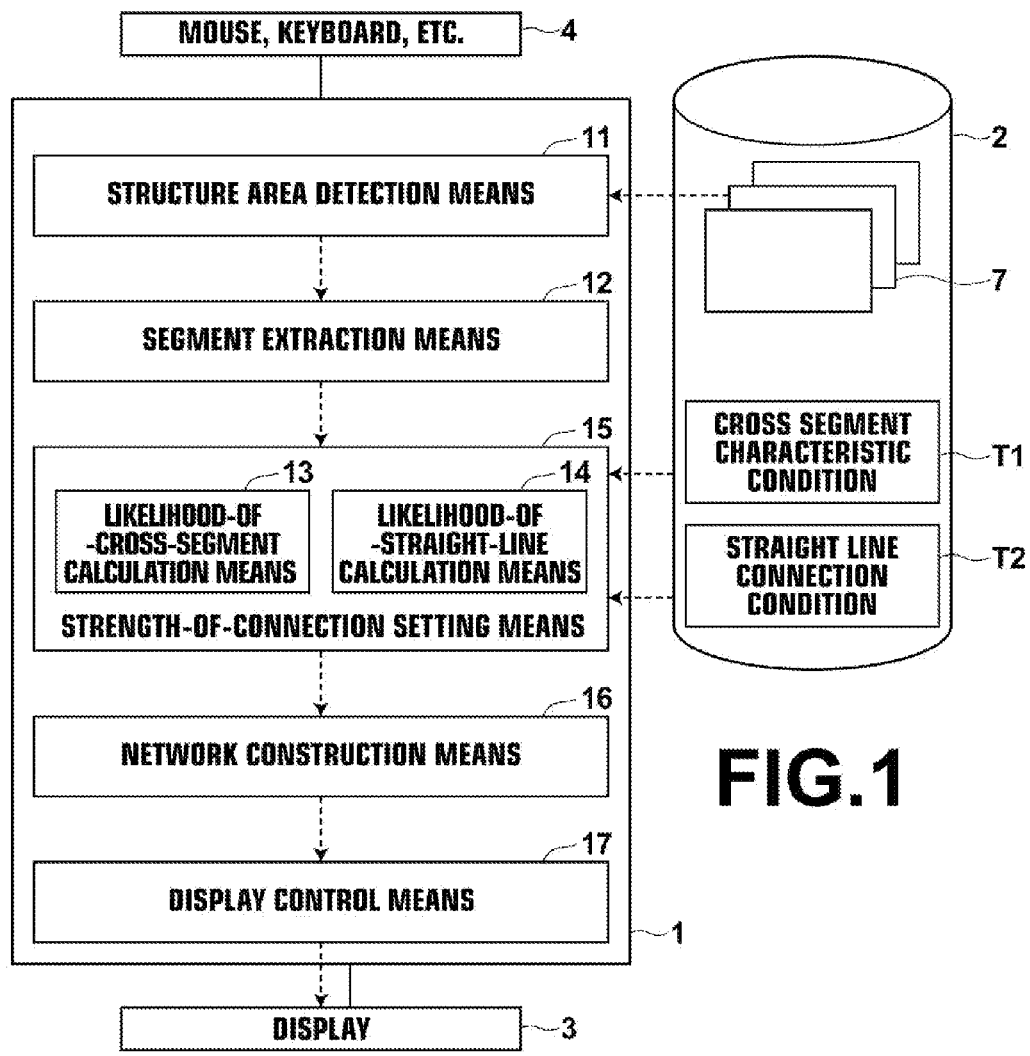
FIG. 1 is a block diagram illustrating a desirable embodiment of a network construction apparatus of the present invention.

Hereinafter, embodiments of a network construction apparatus of the present invention will be described in detail with reference to drawings. FIG. 1 is a schematic diagram illustrating the configuration of a network construction apparatus 1 according to a first embodiment of the present invention. The configuration of the network construction apparatus 1, as illustrated in FIG. 1, is realized by causing a computer to execute a structure detection program that has been read in an auxiliary storage device. At this time, the structure detection program is stored in a recording medium, such as a CD-ROM, or distributed through a network, such as the Internet, and installed in the computer. The network construction apparatus 1 illustrated in FIG. 1 detects structure M, such as a pulmonary artery and a pulmonary vein in a lung for example, in image data. The network construction apparatus 1 includes a structure area detection means 11, a segment extraction means 12, a strength-of-connection setting means 15 including a likelihood-of-cross-segment calculation means 13 and a likelihood-of-straight-line calculation means 14, a network construction means 16, and a display control means 17.

Figure 2:
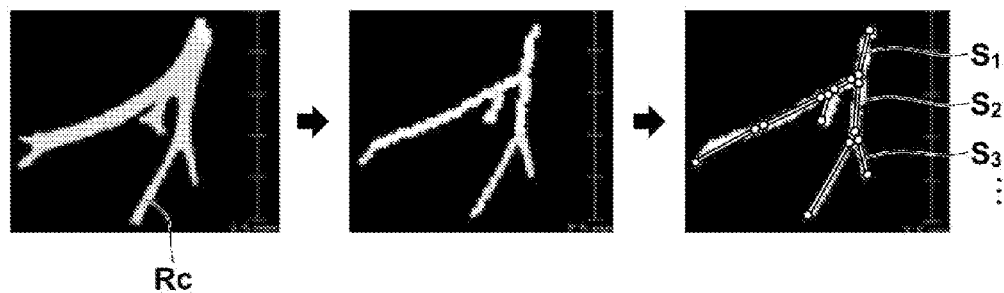
FIG. 2 is a diagram for explaining segment extraction processing on pulmonary blood vessel regions detected as structures.

The structure area detection means 11 detects candidate area Rc in image data by judging whether the candidate area Rc constitutes a part of predetermined structure M. Here, image data 7 are data stored in a data storage means 2, and composed of a two-dimensional image obtained by imaging at an imaging apparatus or a radiation detection apparatus, or three-dimensional volume data generated based on plural two-dimensional images, for example. FIG. 2 is a schematic diagram illustrating a manner of extracting candidate areas Rc of blood vessels that are predetermined plural structure areas, and extracting segments $S_p$ based on the extracted blood vessel regions.

Here, the structure area detection means 11 detects a candidate area by using a method disclosed, for example, in U.S. Patent Application Publication No. 20110135172, or other known techniques. As one of examples, a case of detecting a candidate area Rc of a pulmonary artery and a candidate area Rc of a pulmonary vein in volume data will be described. Here, predetermined structures are the pulmonary artery and the pulmonary vein in a lung.

First, the structure area detection means 11 calculates, based on the values of voxel data constituting the volume data 7, the positions of plural candidate points constituting a core line of the pulmonary artery and a core line of the pulmonary vein, and the directions of the principal axes of the core lines. Alternatively, the structure area detection means 11 may calculate position information about plural candidate points constituting a core line of the pulmonary artery and a core line of the pulmonary vein, and the directions of the principal axes of the core lines by calculating Hessian matrix with respect to the volume data 7, and by analyzing the eigenvalue of the calculated Hessian matrix. Further, the structure area detection means 11 calculates, with respect to voxel data in the neighborhood of each of the candidate points, a feature value representing a likelihood of a pulmonary artery and a feature value representing a likelihood of a pulmonary vein. Further, the structure area detection means 11 judges, based on the calculated feature values, whether the voxel data represent a pulmonary artery region or a pulmonary vein region. The judgment based on the feature value may be performed, for example, based on an evaluation function that has been obtained in advance by machine learning. Accordingly, as illustrated on the left side of FIG. 2, image data that have judged as the pulmonary artery region or the pulmonary vein region in image data are extracted as candidate area Rc.

Next, the segment extraction means 12 extracts plural segments $S_p$ (p=1 through n: n is the number of extracted segments) from candidate area Rc detected by the structure area detection means 11. The segment extraction means 12 obtains a structure area that has been detected by the structure area detection means 11, as illustrated on the left side of FIG. 2. Further, the segment extraction means 12 performs thinning on the obtained structure area by using a known method, as illustrated at the center of FIG. 2. Further, as illustrated on the right side of FIG. 2, the segment extraction means 12 divides, at branch points, lines obtained by thinning. Accordingly, the segment extraction means 12 extracts plural segments. Here, the lines obtained by thinning are divided not only at branch points but also based on a predetermined condition, such as a predetermined interval. The lines after thinning are divided in such a manner to appropriately divide a part of the lines forming a gradual curve into plural segments along the curve.

Figure 3:
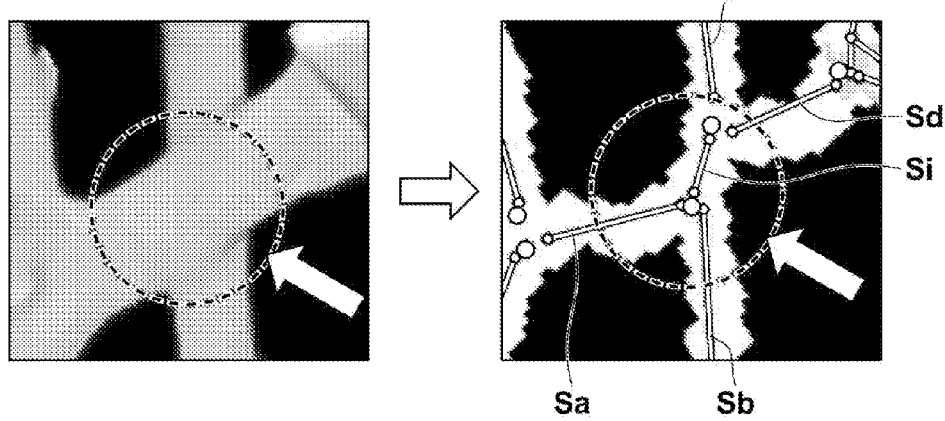
FIG. 3 is a diagram for explaining a cross segment extracted from a structure area by segment extraction processing.

With reference to FIG. 3, the principle of a method for setting a strength of connection by using a strength-of-connection setting means 15 including a likelihood-of-cross-segment calculation means 13 and a likelihood-of-straight-line calculation means 14 will be described.

The left side of FIG. 3 illustrates a part in which a pulmonary artery and a pulmonary vein, extracted by structure extraction processing, overlap with each other. The right side of FIG. 3 represents, as segments, the region illustrated on the left side of FIG. 3. A segment having two endpoints (small white circles) is a segment corresponding to a vertex of a network structure to be constructed. Further, a point (a single white circle) is a branch point of lines after thinning.

The right side of FIG. 3 illustrates a state in which a part of a pulmonary artery and a part of a pulmonary vein, which should be extracted as two separate segments, are extracted as a segment (hereinafter, referred to as a cross segment in some cases). Specifically, as illustrated in FIG. 3, a blood vessel running in a diagonal direction on the left side of FIG. 3 corresponds to three segments Sa, Si, Sd on the right side of FIG. 3. A blood vessel running in a vertical direction on the left side of FIG. 3 corresponds to three segments Sc, Si, Sb on the right side of FIG. 3. As illustrated on the right side of FIG. 3, a part in which the blood vessel running in the diagonal direction and the blood vessel running in the vertical direction overlap with each other on the left side of FIG. 3 is detected as one segment Si (cross segment). In a conventional network construction method, when structures cross with each other, segments Sa and Sd corresponding to one of the structures are not correctly connected to each other, while segments Sc, Si, Sb corresponding to the other structure are connected to each other in a correct order, or segments Sa, Sb, Sc, Sd, Si are connected to each other in a wrong combination. Therefore, in the conventional network construction method, there was a problem that the cross segment prevents accurate construction of a network structure. In the following descriptions, segments in the neighborhood of cross segment Si, such as segments Sa, Sb, Sc, and Sd illustrated on the right of FIG. 3, which should be ordinarily connected to each other through the cross segment Si, will be referred to as neighboring segments.

Here, the present invention has focused on the findings that a cross segment is identifiable by using only a geometric characteristic as described below. Specifically, when plural segments are extracted, a part corresponding to a part in which structures are intermingled with each other is present as a cross segment, which is a segment, and at least two pairs of segments connectable, in a straight line, to each other are present in the neighborhood of the cross segment. Further, this characteristic may be regarded as a characteristic that at least four segments connectable to the cross segment are present in the neighborhood of the cross segment, and the at least four segments constitute at least two pairs of segments connectable to each other in a straight line. In the present embodiment, the aforementioned characteristic is defined as cross segment characteristic condition T1, and the likelihood-of-cross-segment calculation means 13 calculates, based on the cross segment characteristic condition T1, a likelihood of a cross segment that represents a probability that each segment is cross segment Si.

Further, the present invention has focused on the findings that a segment graph corresponding to a structure, such as a blood vessel, is reconstructible as a tree structure that connects segments to each other in straight lines. Specifically, a geometric characteristic between segments that "each of the segments is connected, in a straight line, to another segment in the neighborhood of each of the segments" is defined as straight line connection condition T2. The likelihood-of-straight-line calculation means 14 calculates, based on the straight line connection condition T2, a likelihood of a straight line representing a probability that each of segments is connected, in a straight line, to another segment. The likelihood-of-straight-line calculation means 14 defines the straight line connection condition T2 based on a criterion that a distance between the segments is less than or equal to a threshold value, and a shortest distance between straight lines including neighboring segments is short, and an angle between the neighboring segments is small.

Next, the definitions of the cross segment characteristic condition T1 and the straight line connection condition T2 in the present embodiment will be described in detail.

In the present embodiment, the following four evaluation items are used to specify the cross segment characteristic condition T1 and the straight line connection condition T2. FIGS. 4A through 4D are diagrams for explaining the four evaluation items for defining the cross segment characteristic condition T1 and the straight line connection condition T2, which will be described later. With reference to FIGS. 4A through 4D, the four evaluation items defining the cross segment characteristic condition T1 will be described.

Figure 4A:
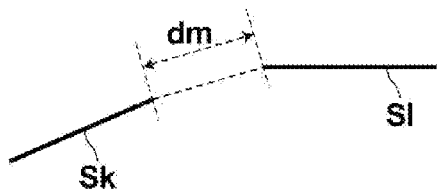
FIG. 4A is a diagram for explaining a method for calculating a shortest distance between vertices of segments.

FIG. 4A is a diagram illustrating shortest distance dm between vertices of two segments Sk, Sl. The vertices of two segments that should be connected to each other are located close to each other. Therefore, a probability of connecting two segments to each other is considered to be higher, as a shortest distance between the vertices of the two segments is shorter.

Figure 4B:
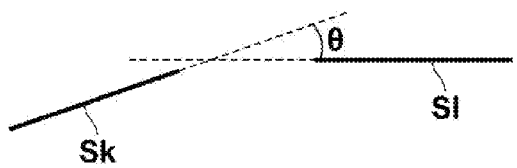
FIG. 4B is a diagram for explaining a method for calculating an angle between segments.

FIG. 4B is a diagram for explaining angle θ between two segments Sk, Sl. As illustrated in FIG. 4B, since two segments Sk, Sl that should be connected to each other are connected in a straight line, angle θ is considered to be small. In other words, a probability of connecting two segments Sk, Sl to each other is considered to be higher, as the angle θ between the two segments Sk, Sl is smaller. Therefore, a probability of connecting the two segments Sk, Sl is considered to be higher, as the inner product of the two segments Sk, Sl is larger, and a probability of connecting the two segments Sk, Sl is considered to be lower, as the inner product of the two segments Sk, Sl is smaller.

Figure 4C:
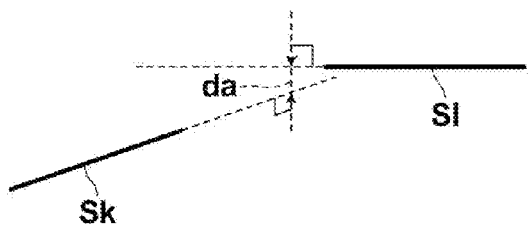
FIG. 4C is a diagram for explaining a method for calculating a shortest distance between straight lines, each including a segment.

FIG. 4C is a diagram for explaining shortest distance da (hereinafter, referred to as a degree of proximity in some cases) between straight lines including two segments Sk, Sl, respectively. As illustrated in FIG. 4C, since two segments Sk, Sl that should be connected to each other are considered to be located substantially along a straight line, a distance between straight lines including the two segments Sk, Sl to be connected to each other, respectively, is considered to be extremely small. Hence, a probability of connecting two segments is considered to be higher, as the degree of proximity is lower.

Figure 4D:
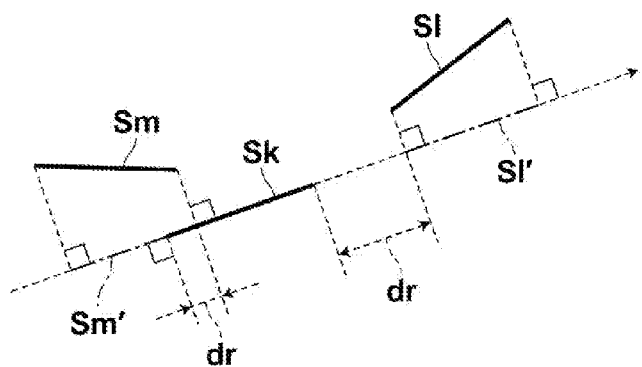
FIG. 4D is a diagram for explaining a method for calculating a degree of overlapping between segments.

FIG. 4D is a diagram for explaining a degree of overlapping between two segments. As illustrated in FIG. 4D, segment sm' is obtained by projecting segment sm onto a straight line including segment Sk, and which is indicated with a broken line in FIG. 4D. Further, the segment sm' has an overlapping portion with segment Sk on the straight line. In the present embodiment, the degree of overlapping between two segments Sk, Sm means length dr of an overlapping portion when one of the two segments Sk, Sm is projected onto a straight line (or a straight line vector) including the other one of the two segments Sk, Sm, and they overlap with each other on the straight line. As illustrated in FIG. 4D, the degree of overlapping between two segments Sk, Sm is dr>0, and the degree of overlapping between two segments Sk, Sl is dr<0. Here, vertices of two segments that should be connected to each other are considered to be arranged in such a manner that each of the vertices of one of the two segments and each of the vertices of the other one of the two segments are arranged in this order along a smoothly extending path so that the segments are smoothly connected to each other. Therefore, no overlapping is considered to exist between the two segments on a straight line including one of the two segments. Hence, when the degree dr of overlapping between the two segments Sk, Sm is large, as illustrated in FIG. 4D, it is possible to estimate that a possibility that the two segments are smoothly connected to each other in a straight line is small. In contrast, the degree dr of overlapping between two segments is substantially zero when the two segments should be connected to each other.

In the present embodiment, cross segment characteristic condition T1 is defined in the following manner. First, a segment that is present in the neighborhood of a cross segment Si and connectable to the cross segment Si in a straight line is defined based on a criterion that shortest distance dm between vertices of the segments is less than or equal to a predetermined threshold value and the degree of overlapping between the segments is not positive (the aforementioned length dr of overlapping between segments is not positive). Further, when at least four segments that have been identified as described above are present for a segment, a characteristic that at least two pairs of segments connectable to each other in a straight line are present among the at least four segments is defined based on a criterion that at least two pairs of segments constituting straight lines with shortest distance da less than a predetermined threshold value between the straight lines, and the segments in each of the at least two pairs of segments having angle θ less than a predetermined threshold value therebetween, are present.

Further, the likelihood-of-cross-segment calculation means provided in the strength-of-connection setting means 15 calculates, based on the aforementioned cross segment characteristic condition T1, a likelihood of a cross segment. In the present embodiment, the likelihood-of-cross-segment calculation means 13 obtains "1" as the likelihood of a cross segment when the cross segment characteristic condition T1 is all satisfied. The likelihood-of-cross-segment calculation means 13 obtains "0" as the likelihood of a cross segment in the other cases.

Further, as represented by the following evaluation formula (1), the strength-of-connection setting means 15 performs, based on the likelihood of a cross segment, evaluation on each segment by delta function δ represented by formula (1). Specifically, delta function δ adopting 0, as a coefficient term of the strength of connection to another segment when a segment of interest is estimated to be a cross segment, and adopting 1, as a coefficient term of the strength of connection to another segment when the segment of interest is estimated to be a non-cross segment is applied. Accordingly, the cross segment is not connected to any segment.

[Formula 1]

$$\delta = \begin{cases} 0 & \text{if } ((i) \& (ii) == 1) \\ 1 & \text{if } ((i) \& (ii) == 0) \end{cases} \quad (1)$$

In Formula 1, signs (i), (ii) represent the following conditions constituting the cross segment characteristic condition T1:

(i) at least four segments (neighboring segments) have shortest distances less than or equal to a threshold value between vertices, and degrees of overlapping, which represent overlapping between the segments, are not positive; and (ii) at least two pairs of segments of neighboring segments have distances (hereinafter, referred to as degrees of proximity) less than or equal to a threshold value between straight lines including the segments, and angles less than or equal to a threshold value between the segments.

Further, the likelihood-of-straight-line calculation means 14 calculates a likelihood of a straight line based on straight line connection condition T2 that a distance between segments is less than or equal to a threshold value, and a shortest distance between straight lines including neighboring segments is small, and an angle between the neighboring segments is small. The likelihood-of-straight-line calculation means 14 calculates the likelihood of a straight line by real function fs composed of four real functions, as described below.

First, the aforementioned four evaluation criteria are used, and evaluation function f1 is defined. Specifically, the evaluation function f1, which is a continuous real function on interval [0, 1], is defined so that the value of the function approaches 0 as a shortest distance between vertices of two segments becomes longer, and the value of the function approaches 1 as the shortest distance between the vertices of the two segments becomes shorter. Further, evaluation function f2, which is a continuous real function on interval [0, 1], is defined so that the value of the function approaches 0 as the inner product of the two segments becomes larger, and the value of the function approaches 1 as the inner product of the two segments becomes smaller. Further, evaluation function f3, which is a continuous real function on interval [0, 1], is defined so that the value of the function approaches 1 as a shortest distance between straight lines including two segments becomes shorter, and the value of the function approaches 0 as the shortest distance between the straight lines including the two segments becomes longer. Further, evaluation function f4, which is a continuous real function on interval [0, 1], is defined so that the value of the function approaches 0 when a degree of overlapping between two segments is positive, and the value of the function approaches 1 when the degree of overlapping between the two segments is not positive.

Further, the likelihood of a straight line is calculated by real function fs represented in the following formula (2). The likelihood of a straight line is higher as the value of the following function fs approaches 1, and the likelihood of a straight line is lower as the value of the following function fs approaches 0.

[Formula 2]

$$fs = f1 \times f2 \times f3 \times f4 \quad (2)$$

Further, strength f of connection is defined for each segment, as follows:

[Formula 3]

$$f = fs \times \delta \quad (3)$$

The formula (3) sets a table of N×N matrix that evaluates a strength of connection between each of all pairs of segments selectable from N segments (N is the number of segments).

Figure 5:
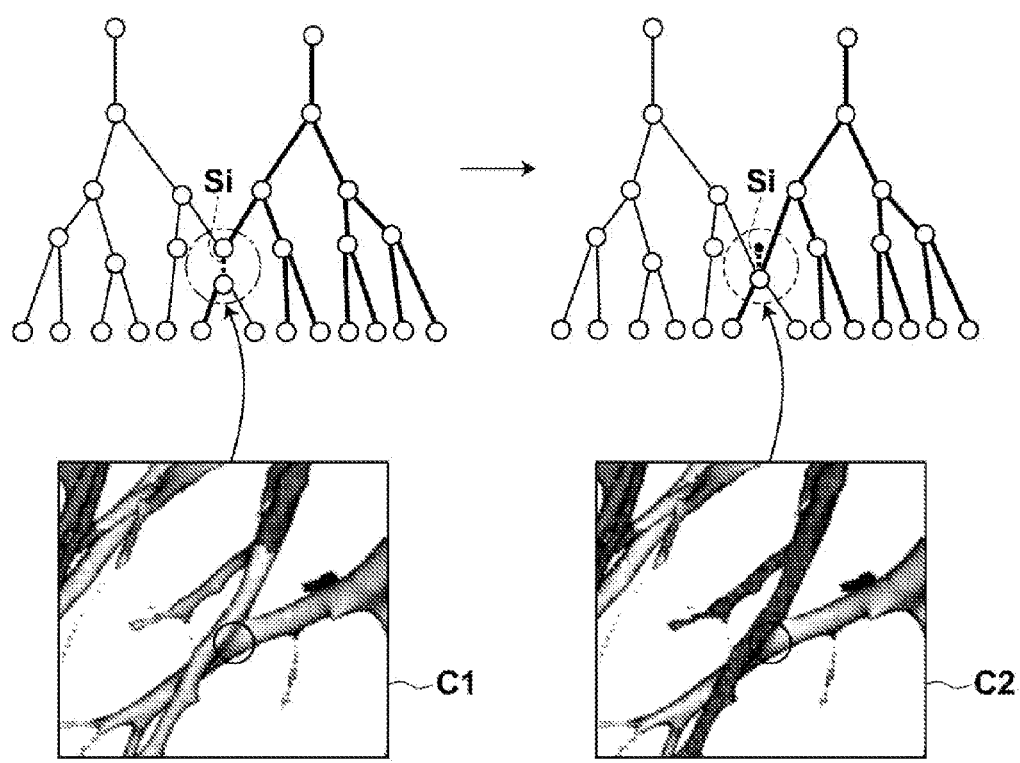
FIG. 5 is a schematic diagram illustrating a network structure constructed by using a conventional method and a network structure constructed by using a method according to an embodiment of the present invention.

Further, the network construction means 16 constructs plural network structures by connecting segments based on the strengths of connection that have been set by using the formula (3). Specifically, the aforementioned N×N matrix defined by using the function is used to evaluate a strength of connection with respect to each of all pairs of combinable segments selected from N segments. Further, a network structure is constructed by connecting a pair of segments having a high strength of connection to each other. For example, the network structure may be constructed by determining an optimal path by using a known spanning tree generation algorithm, such as a minimum spanning tree algorithm and a shortest path tree algorithm, so that the strength f of connection becomes maxΣf. The left side of FIG. 5 illustrates a network structure (bold lines in FIG. 5) representing a pulmonary artery and a network structure (thin lines in FIG. 5) representing a pulmonary vein, which are constructed by using a conventional method. The right side of FIG. 5 illustrates a network structure representing a pulmonary artery and a network structure representing a pulmonary vein, which are constructed according to the present embodiment. As image C1 of FIG. 5 illustrates, blood vessel regions corresponding to a cross segment and neighboring segments, which are circled with a dot-dashed line, are erroneously connected to each other in the conventional method. However, as image C2 of FIG. 5 illustrates, such blood vessel regions are correctly connected to each other in the method of the present embodiment.

Then, the display control means 17 displays, on the display 3, the network structures constructed by the network construction means 16. As the right side of FIG. 5 illustrates, the display control means 17 distinguishably displays a segment having a likelihood of a cross segment of "1", which has been detected in the cross segment calculation processing, and neighboring segments of the segment in the network structure by using a broken-line circle index.

FIG. 6 is a flowchart illustrating a flow of processing by the network construction apparatus 1 according to the first embodiment. With reference to FIG. 6, the flow of processing by the network construction apparatus 1 according to the first embodiment will be described.

First, the structure area detection means 11 obtains volume data 7, and detects candidate area Rc (step S01, please refer to the image on the left side of FIG. 2). Further, the segment extraction means 12 performs thinning on the candidate area Rc, and divides an obtained thin line based on a branch point and a predetermined condition, such as a predetermined distance. Further, the segment extraction means 12 extracts, as segments, the divided thin lines (step S02, please refer to the image at the center of FIG. 2 and the image on the right side of FIG. 2). After then, with respect to all pairs of combinable segments selected from the extracted N segments (N is the number of segments), the strength-of-connection setting means 15 calculates, based on the formula (1), the likelihood of a cross segment by the likelihood-of-cross-segment calculation means 13, and calculates, based on the formula (2), the likelihood of a straight line by the likelihood-of-straight-line calculation means 14 (step S03). Further, the strength-of-connection setting means 15 sets, based on the calculated likelihood of a cross segment and likelihood of a straight line, strength f of connection by using the formula (3) (step S04). Further, the network construction means 16 evaluates the strength f of connection with respect to all pairs of combinable segments selected from the extracted N segments, and constructs a network by connecting, to each other, segments in a pair in which the strength f of connection is high (step S05, please refer to the right side of FIG. 5). Here, the network structure is constructed by determining an optimal path by using a known minimum spanning tree algorithm so that the strength f of connection becomes max$\Sigma$f. Further, the display control means 17 displays the network structure constructed by the network construction means 16 on the display 3. Further, the display control means 17 distinguishably displays a segment having a likelihood of a cross segment of "1", which has been detected in the cross segment calculation processing, and neighboring segments of the segment in the network structure by using a broken-line circle index, and ends the processing of the present embodiment (step S06, please refer to the right side of FIG. 5).

According to the first embodiment, it is possible to prevent erroneous connection of the segments only by using a geometric characteristic between segments. Further, it is possible to accurately detect structure M in image data. Therefore, even if it is impossible to obtain information about the forward direction of a structure, it is possible to accurately detect the structure in the image data.

In the network construction apparatus 1 of the present invention, the strength-of-connection setting means 15 sets a strength of connection between a segment that has a high likelihood of a cross segment and another segment to a low value, and a strength of connection between segments each having a high likelihood of a straight line to a large value. Therefore, it is possible to avoid erroneous connection by preventing connection between a cross segment and another segment. Further, it is possible to connect segments so that the likelihood of a straight line becomes higher. Consequently, it is possible to accurately construct a network corresponding to a structure.

Specifically, in the present embodiment, the strength-of-connection setting means 15 applies delta function $\delta$ adopting 0, as the strength of connection to another segment when the extracted segment has been estimated to be a cross segment, and adopting 1, as the strength of connection to another segment when the extracted segment has been estimated to be a non-cross segment. Therefore, the cross segment is excluded from segments to be connected to construct the network structure, and the network structure is constructed by using straight line connection condition T2 among segments other than the cross segment. Hence, it is possible to increase the possibility that segments in a pair of segments arranged, in a straight line, with a cross segment therebetween are correctly connected to each other. Further, it is possible to more accurately construct the network structure.

Further, in a modified example of the present embodiment, a real function may be used instead of a delta function as the cross segment characteristic condition, and the following formula (4) may be used instead of the formula (3). For example, fc may be a real function on interval [0, 1] that approaches 0 as the probability of a cross segment is higher, and approaches 1 as the probability of a cross segment is lower. In this case, f is a real function on interval [0, 2], and it is judged that the strength of connection is higher as the value of f approaches 2.

[Formula 4]

$$f = fs + fc \qquad (4)$$

Further, the cross segment characteristic condition T1 defines the characteristic that at least two pairs of segments connectable to each other in a straight line are present in the neighborhood of a cross segment by a distance between the segments in each of the at least two pairs of segments as well as at least one of an angle between the segments and a degree of overlapping between the segments projected onto a predetermined straight line. Therefore, it is possible to appropriately evaluate the probability of a cross segment.

Further, the cross segment characteristic condition T1 defines the characteristic that at least two pairs of segments connectable to each other in a straight line are present in the neighborhood of the cross segment, as a characteristic that at least four segments connectable to the cross segment are present in the neighborhood of the cross segment, and the at least four segments constitute at least two pairs of segments connectable to each other in a straight line. Therefore, it is possible to excellently recognize the geometric characteristic of the cross segment, and to appropriately evaluate the probability of the cross segment.

Further, the cross segment characteristic condition T1 defines the characteristic that at least four segments connectable to the cross segment are present in the neighborhood of the cross segment by using at least one of a shortest distance between vertices of segments in each of the at least two pairs of segments, and a criterion that a shortest distance between straight lines including the segments is less than or equal to a predetermined threshold value and the degree of overlapping between the segments projected onto a predetermined straight line is not positive. Therefore, it is possible to excellently recognize the geometric characteristic of the cross segment, and to appropriately evaluate the probability of the cross segment.

Further, the cross segment characteristic condition T1 defines the characteristic that at least two pairs of segments connectable to each other in a straight line are present based on a criterion that at least two pairs of segments constituting straight lines with a small shortest distance between the straight lines, and the segments in each of the at least two pairs of segments having a small angle therebetween, are present. Therefore, it is possible to excellently recognize the geometric characteristic of the cross segment, and to appropriately evaluate the probability of the cross segment.

Straight line connection condition T2 defines the characteristic that each of the segments is connected, in a straight line, to another segment in the neighborhood of each of the segments by using an angle between the segments as well as at least one of a shortest distance between vertices of the segments, a shortest distance between straight lines including the segments and a degree of overlapping between the segments projected onto a predetermined straight line. Therefore, it is possible to excellently recognize the geometric characteristic between the segments, and to appropriately evaluate the likelihood of the straight line of the segments. Further, compared with the method disclosed in Non-Patent Document 1, in which the segments are evaluated only based on an angle, the likelihood-of-straight-line processing of the present embodiment defines the straight line connection condition by using plural evaluation items. Therefore, it is possible to more accurately evaluate the likelihood of a straight line.

Further, the cross segment characteristic condition may define the geometric characteristic between segments in the neighborhood of the intermingled straight line portion among extracted plural segments by using any kind of method as long as the method defines the geometric characteristic that a portion corresponding to the intermingled straight line portion of a structure is present as a cross segment, which is a segment, and that at least two pairs of segments connectable to each other in a straight line are present in the neighborhood of the cross segment. For example, the characteristic of the cross segment characteristic condition that neighboring segments are connectable in a straight line may be defined only by a condition that an angle between the segments is small. Alternatively, the characteristic may be defined only by a degree of proximity, or by a combination of the angle between the segments and the degree of proximity. Further, a different condition may be further added. Further, the angle, the distance, and the degree of overlapping may be calculated by using methods different from the aforementioned methods.

Further, the straight line connection condition may define the geometric characteristic between segments by using any kind of method as long as the method defines the geometric characteristic that each of segments is connected, in a straight line, to a segment in the neighborhood of each of the segments. Further, the definition of the geometric characteristic may be replaced by various other definitions. For example, the straight line connection condition may be defined by using only the condition that the angle between segments is small. Alternatively, the straight line connection condition may be defined by using only the degree of proximity, or by a combination of the angle between the segments and the degree of proximity. Further, a different condition may be further added.

Further, in the present embodiment, the magnitude of an angle is judged based on an inner product. However, the method for judging the magnitude of the angle is not limited to this method. It is needless to say that the magnitude of the angle may be judged by using any kinds of method as long as it is possible to judge the magnitude of the angle.

Further, in the present embodiment, the display control means 17 is further provided. The display control means 17 distinguishably displays, on a display, a segment that has a likelihood of a cross segment greater than or equal to a predetermined threshold value, which is "1" in the present embodiment, among extracted plural segments. Therefore, a user can easily recognize the position of a cross segment and segments in the neighborhood of the cross segment in the network structure.

Further, as illustrated in C2 of FIG. 5, the display control means 17 may distinguishably display a blood vessel area corresponding to a segment that has a likelihood of a cross segment greater than or equal to 1 by enlarging and displaying the blood vessel area in a different window. For example, when a doctor or the like displays a pulmonary artery and a pulmonary vein by using a volume rendering method to diagnose a tumor in the pulmonary vein based on images, if the doctor or the like selects the tumor by a manual operation of an input device, such as a mouse, the display control means 17 detects such a manual operation, and identifies a blood vessel to which the selected tumor belongs and a blood vessel path from the selected tumor to a heart. Further, the display control means 17 enlarges and displays a cross segment on the identified blood vessel path and the neighborhood of the cross segment in a new display window. Therefore, a user can easily recognize whether the blood vessel to which the tumor belongs is connected to an artery or a vein. Hence, it is possible to assist the user in more accurate diagnosis based on images.

In the aforementioned embodiment, the strength-of-connection setting means 15 may set the strength of connection based on a further condition that each segment is connected, in a straight line, along a forward direction of the network structure. FIG. 7 is a diagram for explaining processing for setting the strength of connection between segments in a modified example of the present embodiment. In FIG. 7, plural segments in solid lines correspond to the pulmonary artery, and plural segments in broken lines correspond to the pulmonary vein. In FIG. 7, a portion corresponding to a portion in which the pulmonary artery and the pulmonary vein are intermingled with each other is divided into segments, namely, cross segment Si, and neighboring segments Sa, Sb, Sc, and Sd.

Here, a network structure corresponding to a blood vessel, such as a pulmonary artery, is a directed tree structure with a root, and extends from the root to the leading end of the blood vessel while branching. Further, the network structure corresponding to the blood vessel has a characteristic that segments are connected to each other, in a straight line, toward the forward direction when the segments are connected to each other. In the modified example of this embodiment, such characteristics are considered, and a strength of connection between segments is set with weighting, as illustrated in FIG. 7. The strength of connection is weighted based on an inner product of vector PA and each of vectors PB, PC, PD. The vector PA is oriented from vertex P, which is a parent of a segment of interest, toward middle point A of the segment of interest. Vectors PB, PC, PD are oriented from vertex P, which is the parent of the segment of interest, toward middle points B, C, D of other neighboring segments, respectively. Specifically, the strength-of-connection setting means 15 performs weighting in such a manner that the strength of connection becomes higher as an inner product of the vector PA, which is oriented from vertex P, as the parent of the segment of interest, toward middle point A of the segment of interest, and each of vectors PB, PC, PD, which are oriented from vertex P, as the parent of the segment of interest, toward middle points B, C, D of other neighboring segments, respectively, is larger. Further, the strength-of-connection setting means 15 performs weighting so that the strength of connection becomes lower as the inner product is smaller. For example, an inner product of the vector PA, which is oriented from vertex P, as the parent of the segment of interest, toward middle point A of the segment of interest, and each of vectors PB, PC, PD, which are oriented from vertex P, as the parent of the segment of interest, toward middle points B, C, D of other neighboring segments, respectively, may be defined by real function fp on interval [0, 1] that approaches 1 as the inner product becomes larger, and approaches 0 as the inner product becomes smaller. Further, strength f of connection may be calculated by linearly combining or multiplying the real function fp and the evaluation function represented by formula (3) in the aforementioned embodiment.

As illustrated in FIG. 7, segment Sa and segment Sd are located in such a manner to form a straight line in a forward direction from parent P, because they should ordinarily form a straight line. Therefore, an inner product of vector PA and vector PD is a large value. According to the aforementioned method, weighting is performed in such a manner that the strength of connection becomes higher as the inner product of the vector PA and the vector PD is larger. Therefore, the possibility that the segment Sa and the segment Sd are connected to each other is high. Further, even when an angle between the segment Sa and segment Sc, which should be ordinarily connected to the segment Sb, is small (connectable in a straight line), and there is a possibility that the segment Sa and the segment Sc are erroneously connected to each other, it is possible to reduce the possibility that the segment Sa and the segment Sc are erroneously connected to each other, because it is possible to weight the strength of connection between the segment Sa and the segment Sd more than the strength of connection between the segment Sa and the segment Sc by using the information about parent P. Further, in the aforementioned method, it is not necessary that the end point of a vector for evaluating the forward direction is the middle point of the segment of interest and the middle points of the neighboring segments. Instead, an arbitrary points on the segment of interest and arbitrary points on the neighboring segments may be used.

Further, when the strength-of-connection setting means 15 sets the strength of connection based on a further condition based on the forward direction of the network structure, as in the modified example, it is possible to more accurately construct a network structure with respect to a structure that extends, in a straight line, in the forward direction.

Here, a case in which plural predetermined structures are a pulmonary artery and a pulmonary vein has been used as an example. However, the predetermined structures may be any structures as long as the structures are objects from which shape models, as network structures composed of points and segments connecting the points, are constructible, and the segments are connected to each other in straight lines, and each of the plural predetermined objects has a straight portion that is intermingled with each other. For example, the plural predetermined structures may be a portal vein, a hepatic artery, and a hepatic vein in a liver.

What is claimed is:

1. A network construction apparatus that extracts, as a plurality of segments, each of a plurality of predetermined structures, each including a straight line portion intermingled with each other, from medical image data, and that constructs a plurality of network structures by connecting the extracted plurality of segments for each of the plurality of predetermined structures, the apparatus comprising:

a strength-of-connection setting unit that includes:

a likelihood-of-cross-segment calculation unit that calculates a likelihood of a cross segment representing a probability that each of the extracted plurality of segments is a cross segment, which is a segment, based on a cross segment characteristic condition defining a geometric characteristic between segments in the neighborhood of the intermingled straight line portion that a portion corresponding to the intermingled straight line portion of each of the plurality of predetermined structures is present as a cross segment, and that at least two pairs of segments connectable to each other in a straight line are present in the neighborhood of the cross segment; and a likelihood-of-straight-line calculation unit that calculates a likelihood of a straight line representing a probability that each of the segments is connected, in a straight line, to another segment based on a straight line connection condition defining a geometric characteristic between the segments that each of the segments is connected, in a straight line, to another segment in the neighborhood of each of the segments, and the strength-of-connection setting unit setting a strength of connection between the segments by using the likelihood of a cross segment and the likelihood of a straight line with respect to each of the extracted plurality of segments; and a network structure construction unit that constructs the plurality of network structures by connecting the segments based on the set strength of connection.

2. A network construction apparatus, as defined in claim 1, wherein the strength-of-connection setting unit sets a strength of connection between a segment having a high likelihood of a cross segment and another segment to a small value, and sets a strength of connection between segments each having a high likelihood of a straight line to a large value.

3. A network construction apparatus, as defined in claim 1, wherein the cross segment characteristic condition defines the geometric characteristic that at least two pairs of segments connectable to each other in a straight line are present in the neighborhood of the cross segment by using a distance between the segments in each of the at least two pairs of segments as well as at least one of an angle between the segments and a degree of overlapping between the segments projected onto a predetermined straight line.

4. A network construction apparatus, as defined in claim 1, wherein the cross segment characteristic condition defines the geometric characteristic that at least two pairs of segments connectable to each other in a straight line are present in the neighborhood of the cross segment, as a characteristic that at least four segments connectable to the cross segment are present in the neighborhood of the cross segment, and the at least four segments constitute at least two pairs of segments connectable to each other in a straight line.

5. A network construction apparatus, as defined in claim 4, wherein the cross segment characteristic condition defines the characteristic that at least four segments connectable to the cross segment are present in the neighborhood of the cross segment by using at least one of a shortest distance between vertices of segments in each of the at least two pairs of segments, and a criterion that a shortest distance between straight lines including the segments is less than or equal to a predetermined threshold value and the degree of overlapping between the segments projected onto a predetermined straight line is not positive.

6. A network construction apparatus, as defined in claim 5, wherein the cross segment characteristic condition defines the geometric characteristic that at least two pairs of segments connectable to each other in a straight line are present based on a criterion that at least two pairs of segments constituting straight lines with a small shortest distance between the straight lines, and the segments in the neighborhood of the cross segment in each of the at least two pairs of segments having a small angle therebetween, are present.

7. A network construction apparatus, as defined in claim 1, wherein the straight line connection condition defines the geometric characteristic that each of the segments is connected, in a straight line, to another segment in the neighborhood of each of the segments by using an angle between the segments as well as at least one of a shortest distance between vertices of the segments, a shortest distance between straight lines including the segments and a degree of overlapping between the segments projected onto a predetermined straight line.

8. A network construction apparatus, as defined in claim 1, wherein the strength-of-connection setting unit sets the strength of connection based on a further condition that the segments are connected to each other, in a straight line, along a forward direction of the network structure.

9. A network construction apparatus, as defined in claim 1, wherein the plurality of predetermined structures are a pulmonary vein and a pulmonary artery.

10. A network construction apparatus, as defined in claim 1, wherein the plurality of predetermined structures are a portal vein, a hepatic artery, and a hepatic vein.

11. A network construction apparatus, as defined in claim 1, the apparatus further comprising:
a display control unit that distinguishably displays, on a display device, at least one segment of the extracted plurality of segments, the at least one segment having the likelihood of a cross segment that is greater than or equal to a predetermined threshold value.

12. A network construction method that extracts, as a plurality of segments, each of a plurality of predetermined structures, each including a straight line portion intermingled with each other, from medical image data, and that constructs a plurality of network structures by connecting the extracted plurality of segments for each of the plurality of predetermined structures, the method comprising the steps of:
calculating a likelihood of a cross segment representing a probability that each of the extracted plurality of segments is a cross segment, which is a segment, based on a cross segment characteristic condition defining a geometric characteristic between segments in the neighborhood of the intermingled straight line portion that a portion corresponding to the intermingled straight line portion of each of the plurality of predetermined structures is present as a cross segment, and that at least two pairs of segments connectable to each other in a straight line are present in the neighborhood of the cross segment;
calculating a likelihood of a straight line representing a probability that each of the segments is connected, in a straight line, to another segment based on a straight line connection condition defining a geometric characteristic between the segments that each of the segments is connected, in a straight line, to another segment in the neighborhood of each of the segments;
setting a strength of connection between the segments by using the likelihood of a cross segment and the likelihood of a straight line with respect to each of the extracted plurality of segments; and
constructing the plurality of network structures by connecting the segments based on the set strength of connection.

13. A non-transitory computer-readable recording medium stored therein a network construction program that extracts, as a plurality of segments, each of a plurality of predetermined structures, each including a straight line portion intermingled with each other, from medical image data, and that constructs a plurality of network structures by connecting the extracted plurality of segments for each of the plurality of predetermined structures, the program causing a computer to function as:
a strength-of-connection setting unit that includes:
a likelihood-of-cross-segment calculation unit that calculates a likelihood of a cross segment representing a probability that each of the extracted plurality of segments is a cross segment, which is a segment, based on a cross segment characteristic condition defining a geometric characteristic between segments in the neighborhood of the intermingled straight line portion that a portion corresponding to the intermingled straight line portion of each of the plurality of predetermined structures is present as a cross segment, and that at least two pairs of segments connectable to each other in a straight line are present in the neighborhood of the cross segment; and
a likelihood-of-straight-line calculation unit that calculates a likelihood of a straight line representing a probability that each of the segments is connected, in a straight line, to another segment based on a straight line connection condition defining a geometric characteristic between the segments that each of the segments is connected, in a straight line, to another segment in the neighborhood of each of the segments, and
the strength-of-connection setting unit setting a strength of connection between the segments by using the likelihood of a cross segment and the likelihood of a straight line with respect to each of the extracted plurality of segments; and
a network structure construction unit that constructs the plurality of network structures by connecting the segments based on the set strength of connection.

* * * * *